United States Patent [19]

Klees

[11] Patent Number: 5,748,239
[45] Date of Patent: May 5, 1998

[54] METHOD AND APPARATUS FOR CAPTURING A STORED PREEXISTING IMAGE ON A USER'S IMAGE RECORDING MEDIUM

[75] Inventor: Kevin John Klees, Rochester, N.Y.

[73] Assignee: Eastman Kodak Company, Rochester, N.Y.

[21] Appl. No.: 789,172

[22] Filed: Jan. 24, 1997

Related U.S. Application Data

[63] Continuation of Ser. No. 356,027, Dec. 14, 1994, abandoned.

[51] Int. Cl.[6] .................................................. H04N 5/225
[52] U.S. Cl. ............................. 348/373; 348/61; 396/2
[58] Field of Search .......................... 348/61, 143, 207, 348/373; 396/2

[56] References Cited

U.S. PATENT DOCUMENTS

| | | | |
|---|---|---|---|
| 4,688,105 | 8/1987 | Bloch et al. | 358/335 |
| 4,769,715 | 9/1988 | Feldman et al. | 358/345 X |
| 4,789,907 | 12/1988 | Fischetti et al. | |
| 4,922,285 | 5/1990 | Torisawa et al. | |
| 5,210,603 | 5/1993 | Sabin | 358/335 X |
| 5,500,700 | 3/1996 | Massarsky | 396/2 |

*Primary Examiner*—Wendy Garber
*Attorney, Agent, or Firm*—Sheridan, Ross & McIntosh

[57] ABSTRACT

A stored image capture system intended to provide an image capturing device for use by the general public at sites having objects of interest. The stored image capture system is designed to accept a user's image recording medium and allow the user to capture on the user's image recording medium a stored image of an object of interest. The system generally includes a compartment for receiving an image recording medium, a memory device to store an image, a display device to display the stored image for viewing by the user, a projection device to project the stored image onto the image recording medium, and a control mechanism to control the operation of the memory device, the display device and the projection device.

6 Claims, 2 Drawing Sheets

METHOD AND APPARATUS FOR CAPTURING A STORED PREEXISTING IMAGE ON A USER'S IMAGE RECORDING MEDIUM

CROSS REFERENCE TO RELATED APPLICATIONS

This is a Continuation of application Ser. No. 08/356,027 filed 14 Dec. 1994 now abandoned.

Reference is made to commonly assigned U.S. patent application Ser. No. 08/255,721, entitled IMAGE CAPTURE SYSTEM, in the name of Kevin J. Klees and filed on even date herewith.

FIELD OF THE INVENTION

This invention relates to image capture systems for use by the general public which allow the user to capture on the user's image recording medium a stored image.

BACKGROUND OF THE INVENTION

Photographic systems available for general public use are primarily for quick, on-site portraits of the user or other persons. For example, the known art includes coin operated finishing booths having a fixed lens camera which takes a series of exposures of one or more individuals sitting in the booth. Soon after the exposures have taken place, the exposed film is developed and the corresponding photographs are dispensed to the user.

Finishing booths offering the user a selection of images as background for the person or persons being photographed are also known. For example, in U.S. Pat. No. 3,864,708 by Allen, issued Feb. 4, 1975, the background scene is from the city in which the finishing booth is located. U.S. Pat. No. 4,688,105 by Bloch et. al., issued Aug. 18, 1987, discloses a video recording booth for self-service production of vended video cassette recordings to a user wherein the user preselects, among other things, the background.

These systems are used for portrait related photography where the resulting photograph (or video cassette) is dispensed at the finishing booth soon after the photograph (or video) is made. These systems are not adaptable to accepting a user's photographic film or transferring high quality images onto the user's photographic film. Further, these systems are usually found in shopping malls or supermarkets and are not adaptable to being located outside at or near objects of interest. As a result, the general public has been left with the costly and bothersome alternative of purchasing slides of the object of interest, usually at gift shops at or near the site of the object of interest, and converting the purchased slides to photographs.

In view of the deficiencies of known systems, it would be desirable to provide a stored image capture system for use by the general public where the system accepts the user's image recording medium, such as photographic film. It would be advantageous if the system is available for public use at or close to geographic locations having objects of interest. It would be advantageous if the system allows the user to capture on the user's image recording medium a stored image of the object of interest previously captured, for example, under optimal weather and lighting conditions. For example, the system could allow a user to preview one or more stored images of the object of interest captured under varying weather and lighting conditions, select one of the stored images previewed and capture the selected stored image on the user's image recording medium. It would be desirable to provide a stored image capture system which allows a user to use a portion of their image recording medium, remove the image recording medium and use the unused portion in another image capture system or photographic system, such as the user's own camera.

SUMMARY OF THE INVENTION

The stored image capture system is designed to accept a user's image recording medium, such as photographic film or an electronic image recording medium, and allow the user to capture on the user's image recording medium an image, for example, of an object of interest such as Niagara Falls, captured previously and stored in the system's memory. Preferably, the system of the present invention is available for use by the general public, and more preferably, for use by the general public at or close to sites having objects of interest. For example, if a system of the present invention were located at or near Niagara Falls, a member of the general public would load the system with their photographic film and transfer onto their film an image of Niagara Falls previously taken in optimal weather and/or lighting conditions (i.e. a stored image). It should be appreciated that the system of the present invention can be adapted to use any image capturing technique, including known chemical and electronic techniques, as well as techniques developed in the future.

Preferably, the stored image capture system is adaptable to receive 35 mm photographic film which is commonly used in known cameras. Preferably, the system also has a mid-roll interrupt feature. For example, a stored image capture system having a mid-roll interrupt feature allows a user to expose several frames of their photographic film, remove the film, and load the same film in another image capture system, or a photographic system (e.g. the user's own camera), having the mid-roll interrupt feature. Preferably, once the film is loaded, the system having the mid-roll interrupt feature automatically advances the film to the next usable frame.

The stored image capture system's ability to capture a stored image allows the user to capture an image of the object of interest regardless of weather or lighting conditions at the time the user is visiting the object of interest. It also allows the user to capture an image of the object of interest previously captured, for example, at optimal angles and having excellent composition. Preferably, the image capture system of the present invention offers the user the option of capturing one or more stored images of the object of interest previously captured in varying weather and/or lighting conditions and/or at varying angles and compositions. Additionally, the system can offer the user the option of capturing other stored images, related or unrelated to the object of interest, e.g. a stored image of the Grand Canyon available for capture using a system located at Niagara Falls.

DETAILED DESCRIPTION

Figure 1:
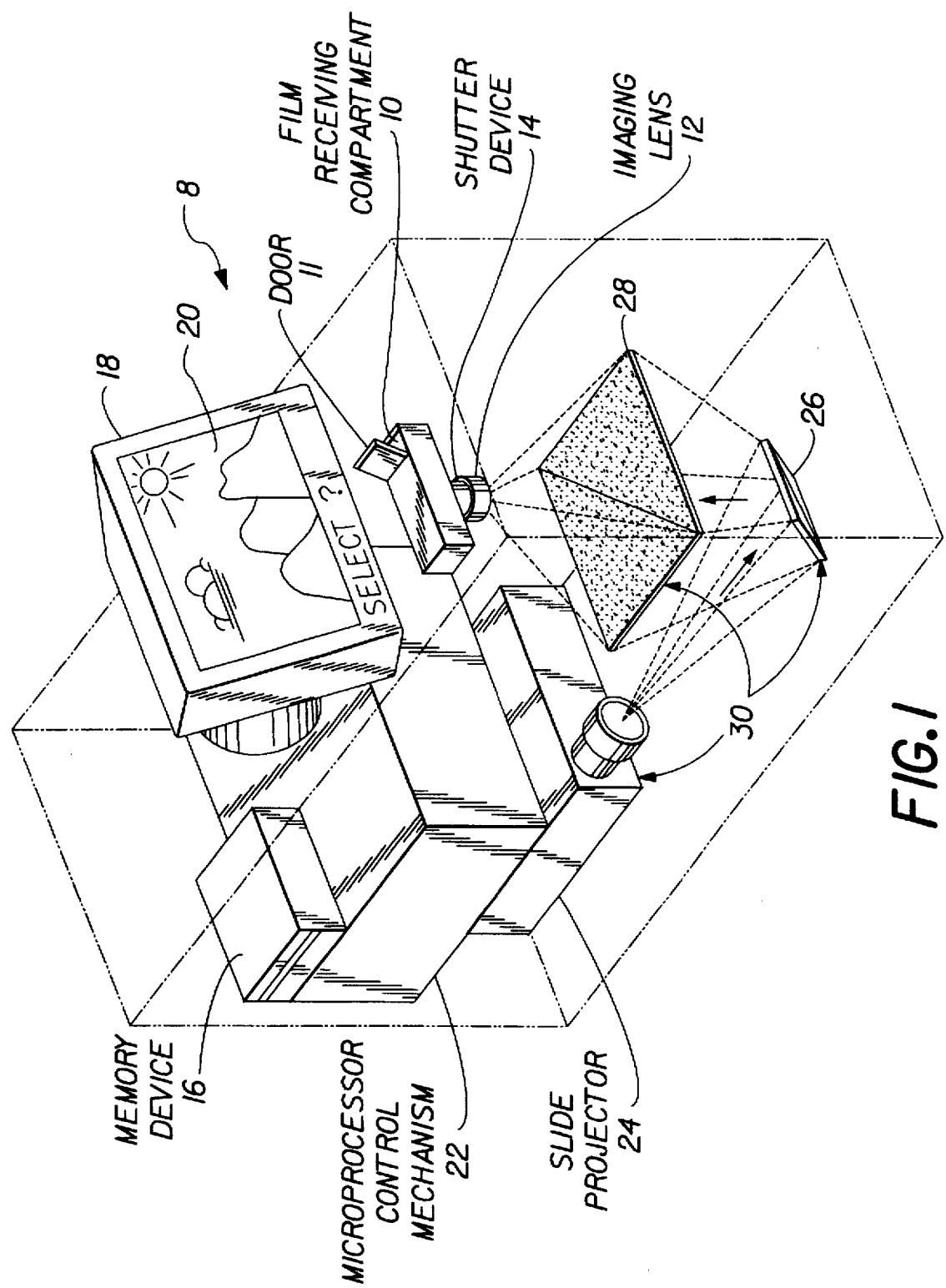
FIG. 1 is a perspective view of one embodiment of a stored image capture system according to the present invention.

Referring to FIG. 1, one embodiment of the image capture system 8 of the present invention is shown. The system 8 generally includes a compartment 10 for receiving an image recording medium (not shown), an imaging lens 12, a shutter device 14, a memory device 16 to store an image, a display device 18 to display the stored image for viewing by a user, a projection device 30, including a slide projector 24, a tilting mirror 26 and a ground glass screen 28, to project a stored image onto the image recording medium (not shown) for capture thereon, and a control mechanism 22 to control the operation of the memory device 16, the display device 18 and the projection device 30.

Preferably, the system 8 is designed for use by the general public, and more preferably, for use by the general public at or close to sites having objects of interest, such as Niagara Falls or the Grand Canyon. For example, a stored image capture system of the present invention can be positioned at or near publicly accessible locations providing views of Niagara Falls. In this circumstance, a member of the general public (i.e. a user) could approach the system, load the system with their photographic film and elect to transfer onto their film an image of Niagara Falls previously photographed, for example, under optimal weather and/or lighting conditions.

Preferably, the stored image capture system is adaptable to receive the user's image recording medium (e.g. photographic film or electronic image recording medium). More preferably, the system accepts 35 mm photographic film. It should be appreciated that the stored image capture system of the present invention can be adapted to use any image capturing technique, including known chemical and electronic techniques, as well as techniques developed in the future.

A user can be instructed regarding the system's operation by known means, including printed matter and/or interactive user interfaces such as visual and/or audible aids, for example, liquid crystal displays, cathode ray tubes ("CRT") and/or voice synthesizers. Preferably, a display device 18 is used to visually instruct the user on the system's operation. For example, when a user first approaches a system, the display device 18 can instruct the user on loading the system with the user's photographic film. Once loaded, the display device 18 can instruct the user on the system's other operations, including viewing a stored image, capturing a stored image and returning the user's image recording medium.

Preferably, the display device 18 is capable of accepting user input. More preferably, the display device 18 is capable of accepting user input by the user touching the screen 20 of the display device 18. For example, the display device 18 can display an interactive menu to guide the user on the system's operation, including loading the system with the user's image recording medium (not shown). The interactive menu can also accept user commands to view a stored image, capture a stored image and return the user's image recording medium (not shown) to the user.

A user loads a system 8 according to the present invention by opening the image recording medium compartment door 11, placing the user's image recording medium in the compartment 10 and closing the compartment door 11. Preferably, after a user has loaded their image recording medium (not shown), the system 8 automatically positions the user's image recording medium (not shown) for capturing images. For example, if a user loads the system 8 with a new roll of photographic film, the system automatically advances the film to the first frame. Preferably, the system employs a mid-roll interrupt feature as described in U.S. Pat. No. 4,965,600 by Smart et. al., assigned to Eastman Kodak Company, issued Oct. 23, 1990; and U.S. Pat. No. 4,947,197 by Smart et. al., assigned to Eastman Kodak Co, issued Aug. 7, 1990. A system 8 having a mid-roll interrupt feature allows a user to capture several images, remove the image recording medium (not shown), and use the unused portion of the image recording medium (not shown) in another system having the mid-roll interrupt feature. For example, if a user loads photographic film in a system having a mid-roll interrupt feature, the system automatically advances the film to the first usable frame.

One operation of the system 8 is displaying for a user's viewing a stored image capable of being captured on the user's image recording medium (not shown). Preferably, the system 8 displays one or more stored images showing the object of interest, or other objects, in varying weather and/or lighting conditions and at varying angles and/or compositions. For example, in the preferred embodiment, a display device 18 displays an interactive menu which allows a user to scroll through any number of different stored images. It should be appreciated that the system of the present invention is not limited to having a specific operation of displaying a stored image. Displaying images can be accomplished in many ways. For example, a user can be presented with printed matter and/or a CRT displaying a stored image capable of being captured on a user's image recording medium (not shown). In this circumstance, the printed matter and/or CRT could be positioned in close proximity to the stored image capture system. In the preferred embodiment, where multiple stored images are available for capture, the printed matter and/or CRT could display multiple stored images with a related identifying code which a user could input to the system to allow the system to identify the stored image prior to the user capturing the selected stored image.

In one embodiment of the invention, the system includes a memory device 16 for storing a stored image, a display device 18 for displaying the stored image, a control mechanism 22 for retrieving the stored image from the memory device 16 and transferring the stored image to the display device 18 for display and a projection device 30 for projecting a stored image for capture on the user's image recording medium. Preferably, the memory device 16 stores the stored image in digital form. More preferably, the memory device 16 is an optical disc and optical disc reader similar to those known in the art. Preferably, the control mechanism 22 is a programmable microprocessor similar to ones known in the art. More preferably, the control mechanism 22 is a computer. Preferably, the display device 18 is a color CRT. More preferably, the display device 18 is a color CRT having touch screen capabilities. In one embodiment, the projection device 30 includes a CRT which displays the stored image at a resolution of at least 512×512. In another embodiment, the projection device 30 includes a slide projector 24 (see FIG. 1) having slides and a ground glass screen 28.

In a preferred embodiment where a display device 18 is used to display a stored image, a control mechanism 22 retrieves a stored image from the memory device 16 and transfers it to the display device 18 for display and viewing by a user. Preferably, when a user is viewing a stored image, the user has the option of viewing a different stored image (if multiple stored images are available). Preferably, the system is adapted to receive a user's command to view a different stored image. More preferably, a display device 18 displaying an interactive menu is employed to accept the user's command by the user touching the display device 18, and more preferably touching the screen 20 of the display device 18. For example, if the user wishes to view a different stored image, the user touches the appropriate spot on the display device 18. Upon recognizing the user's touch, the control mechanism 22 retrieves another stored image from the memory device 16 and transfers the stored image to the display device 18 for display and viewing by the user. Preferably, once the display device 18 displays the new stored image, the user has the option of displaying another stored image.

Preferably, when a user is viewing a stored image, the user has the option of initiating an image capture action on the displayed stored image. Preferably, the system is adapted to receive a user's command to capture the displayed stored image on the user's image recording medium (not shown). More preferably, a display device 18 displaying an interactive menu is employed to accept the user's command by the user touching the display device 18, and more preferably, the screen 20 of the display device 18. For example, a user while viewing a stored image could touch the appropriate spot on the display device 18 to initiate an image capture action. Upon recognizing the user's touch, the control mechanism 22 commands the projection device 30 to project the displayed stored image onto the image recording medium (not shown) for an appropriate time. Preferably, following completion of the image capture action, the display device 18 displays the stored image and allows the user the option of capturing the image displayed or displaying another stored image.

With specific reference to FIG. 1, one embodiment is shown where the projection device 30 includes a slide projector 24 containing slides (not shown) of the stored image or images available for capture by the user on the user's image recording medium (not shown). For example, Eastman Kodak's Ektalite Model No. 1000 can be used. In this preferred embodiment, when the user initiates an image capture action, the control mechanism 22 commands the slide projector 24 to project the stored image onto a tilting mirror 26 which reflects the stored image onto a ground glass screen 28 which serves to focus the projected stored image. In the preferred embodiment where multiple stored images are available for capture, the control mechanism 22 commands the slide projector 24 to project the image on the slide (not shown) containing the stored image being displayed on the display device 18 when the user initiates the image capture action. The stored image is then captured on the user's image recording medium (not shown). For example, the user's photographic film can be appropriately exposed to the stored image by enabling the slide projector 24 and opening and closing the shutter device 14 located in front of the film. In this embodiment of the invention, an imaging lens 12 is located in front of the shutter device 14 to direct and focus the image from the ground glass screen 28 onto the user's image recording medium (not shown). Preferably, the user's image recording medium (not shown) is automatically advanced to the next usable portion upon completion of the image capture action. In the circumstance that the user's image recording medium (not shown) has no remaining usable portion, the system prepares the image recording medium (not shown) for return and returns the image recording medium (not shown) to the user. For example, if the system is loaded with 35 mm photographic film, the system retracts the user's film into the film's cartridge and the film compartment door opens to allow the user access to the rewound film cartridge.

Figure 2:
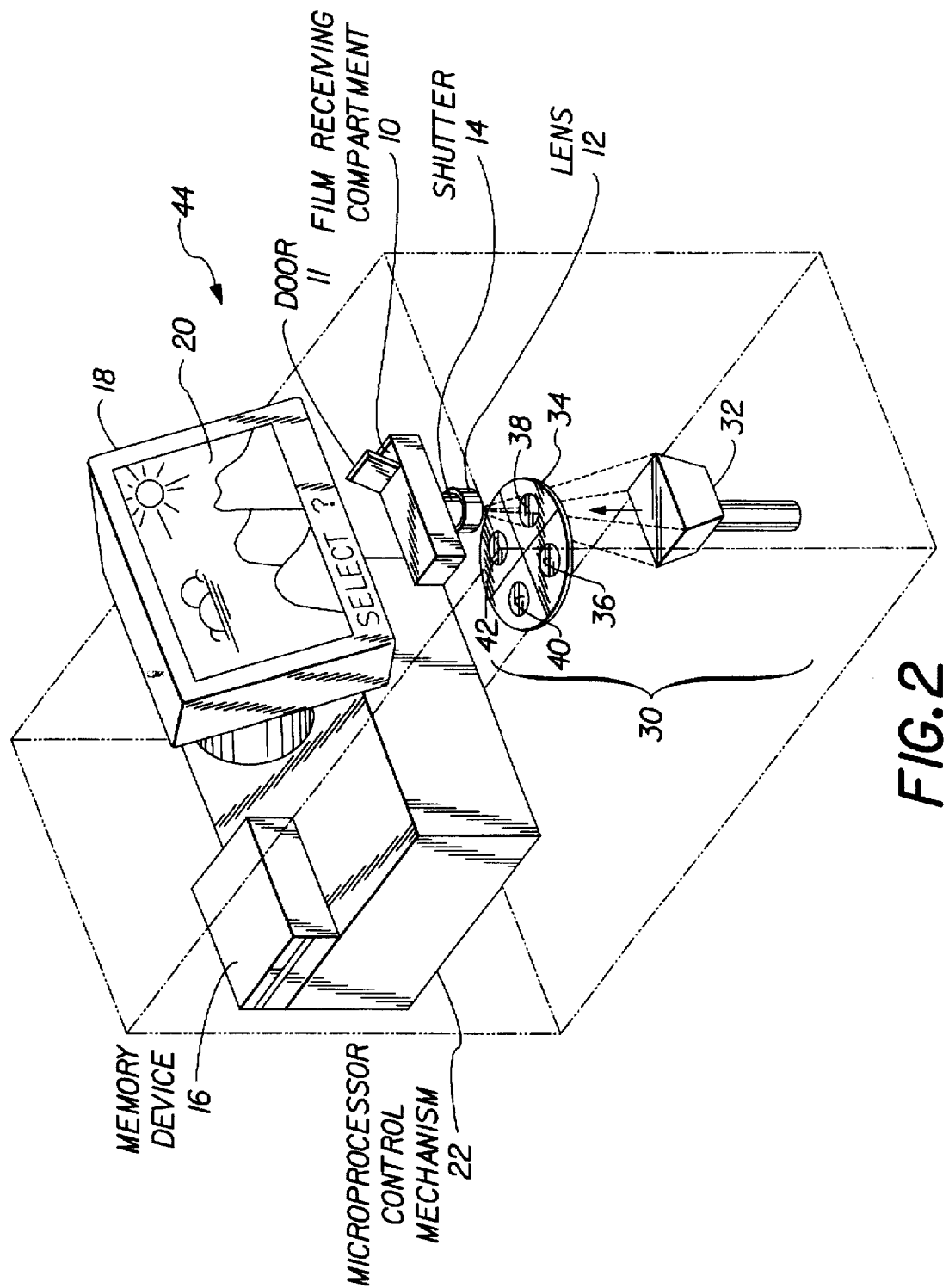
FIG. 2 is a perspective view of an alternative embodiment of a stored image capture system according to the present invention.

With reference to FIG. 2, another embodiment of the system 44 of the present invention is shown. In this embodiment, the projection device 30 includes a CRT 32 and a filter wheel 34 having color filters. The image capture action includes processing a stored image into a plurality of color separations and projecting each color separation through a corresponding color filter through an imaging lens 12 and onto the image recording medium (not shown) for an appropriate time. An appropriate exposure time is accomplished by either enabling and blanking the CRT 32 and/or opening and closing the shutter device 14.

Preferably, the CRT 32 is a monochrome CRT and the filter wheel 34 has a red filter 36, blue filter 40 and a green filter 38. Preferably, the stored image is processed into red, blue and green color separations and, during the image capture action, the CRT 32 projects the processed color separations through a corresponding red filter 36, blue filter 40 and green filter 38. For example, when an image capture action is initiated, the control mechanism 22 retrieves the stored image being displayed for the user's viewing from the memory device 16. The processed green image is projected through a green filter 38 on a filter wheel 34 through an imaging lens 12 and onto the user's image recording medium (not shown). An appropriate exposure time for the processed image is achieved by enabling and blanking the CRT 32 and opening and closing the shutter device 14. After the user's image recording medium (not shown) has been appropriately exposed to the processed green image, the image capture action is completed by similarly exposing the user's image recording medium (not shown) to a processed blue image and a processed red image.

In another embodiment of the invention, a user has the option of adding text to a stored image before capturing the stored image (and text) on the user's image recording medium. Preferably, the system is adapted to receive a user's command to add text to the stored image before capturing the stored image. More preferably, a display device 18 displaying an interactive menu is employed to accept the user's command by the user touching the display device 18, and more preferably, the screen 20 of the display device 18. For example, a user while viewing a stored image could touch the appropriate spot on the display device 18 to allow the user to input text for commenting on the stored image. After entering the text, the user can initiate an image capture action. Upon recognizing the user command to capture the displayed stored image with text, the control mechanism 22 formats the entering text and creates a mask. The control 22 mechanism further processes the stored image into a plurality of color separations, modifies each color separation with the mask and causes each modified color separation to be projected through a corresponding color filter and onto the image recording medium (not shown). The image capture action is completed by the control mechanism 22 causing the text to be projected through a neutral density filter 42 and onto the image recording medium (not shown).

Preferably, when the image capture action is initiated, the control mechanism 22 retrieves the stored image being displayed for the user's viewing from the memory device 16, formats and masks the text entered by the user, processes the stored image into a green color separation using the mask to modify the green color separation so that no exposure takes place on the image recording medium in the area reserved for the text. The processed and masked green image is projected through a green filter 38 on a filter wheel 34 and onto the user's image recording medium (not shown). An appropriate exposure time for the processed image is achieved by enabling and blanking the CRT 32 and opening and closing the shutter device 14. After the user's image recording medium (not shown) has been appropriately exposed to the processed green image, the user's image recording medium (not shown) is similarly exposed to a processed and masked blue image and a processed and masked red image. The image capture action is completed by the control mechanism 22 causing the CRT to project the text entered by the user through a neutral density 42 filter on the filter wheel 34 and onto the image recording medium (not shown).

Preferably, when a user is viewing a stored image, the user has the option of removing their image recording medium (not shown). For example, in the preferred embodiment where a display device 18 displaying an interactive menu is employed to accept the user's command by the user touching the display device 18, the user could touch the appropriate spot on the display device 18 to command the system to return the user's image recording medium (not shown). Upon recognizing the user's touch, the system would prepare the user's image recording medium (not shown) for return and return the image recording medium (not shown) to the user. For example, if the system is loaded with 35 mm photographic film, the system would cause the film to be retracted into the film's cartridge and the film compartment door would open to allow the user access to the rewound film cartridge.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. An interactive stored image capture system for use by a camera user comprising:

film acceptance means for accepting insertion of a camera user's film medium;

means for storing a plurality of preexisting images display means for generating a human viewable display of selected ones of said preexisting images;

interactive selection means for enabling selection of one or more of said preexisting images by said camera user in response to viewing said displayed preexisting images;

means for projecting said selected preexisting images;

means for capturing said projected images onto said camera user's film medium; and film return means for returning said film medium to the camera user upon completion of said image capture.

2. The image capture system of claim 1 wherein said film acceptance means is adapted to accept a film roll in a camera film cartridge.

3. The image capture system of claim 2 wherein said film roll contains at least some previously exposed images thereon; and further including means for sensing said previously exposed image frames and advancing said film roll to available unexposed image frame areas.

4. The image capture system of claim 2 wherein said film acceptance means is operative to extract said film from said cartridge and said film return means is operative to retract said film into said cartridge prior to returning said cartridge to the camera user.

5. The image capture system of claim 1 wherein said display means comprises a cathode ray tube display.

6. The image capture system of claim 1 further comprising means for adding text to the capture image on the film medium.

* * * * *